United States Patent
Son et al.

(10) Patent No.: US 10,663,356 B2
(45) Date of Patent: May 26, 2020

(54) METHOD FOR MEASURING TEMPERATURE AT EACH LOCATION OF PIPE IN HOT WATER SUPPLY SYSTEM

(71) Applicant: KYUNGDONG NAVIEN CO., LTD, Pyeongtaek-si, Gyeonggi-do (KR)

(72) Inventors: Seung Kil Son, Seoul (KR); Si Hwan Kim, Seoul (KR); Chang Heo Heo, Seoul (KR); Jung Keom Kim, Seoul (KR); You Bin Lee, Seoul (KR)

(73) Assignee: KYUNGDONG NAVIEN CO., LTD., Pyeongtaek-si, Gyeonggi-Do (KR)

( * ) Notice: Subject to any disclaimer, the term of this patent is extended or adjusted under 35 U.S.C. 154(b) by 227 days.

(21) Appl. No.: 15/744,380

(22) PCT Filed: Aug. 4, 2016

(86) PCT No.: PCT/KR2016/008585
§ 371 (c)(1),
(2) Date: Jan. 12, 2018

(87) PCT Pub. No.: WO2017/026737
PCT Pub. Date: Feb. 16, 2017

(65) Prior Publication Data
US 2018/0202871 A1 Jul. 19, 2018

(30) Foreign Application Priority Data
Aug. 11, 2015 (KR) .................. 10-2015-0112920

(51) Int. Cl.
*G01K 13/02* (2006.01)
*G01K 7/42* (2006.01)
(Continued)

(52) U.S. Cl.
CPC ......... *G01K 13/02* (2013.01); *F24D 17/0078* (2013.01); *F24D 19/1051* (2013.01);
(Continued)

(58) Field of Classification Search
USPC ................ 374/148, 208, 166, 141
See application file for complete search history.

(56) References Cited

U.S. PATENT DOCUMENTS

| 9,011,608 B2 * | 4/2015 | Amundsen | G01B 21/085 |
| | | | 134/19 |
| 2011/0122915 A1 * | 5/2011 | Wang | G01K 17/00 |
| | | | 374/44 |
| 2011/0282619 A1 * | 11/2011 | Laursen | G01K 1/022 |
| | | | 702/130 |

FOREIGN PATENT DOCUMENTS

| KR | 10-1996-0041947 A | 12/1996 |
| KR | 10-2010-0091360 A | 8/2010 |

(Continued)

*Primary Examiner* — Mirellys Jagan
(74) *Attorney, Agent, or Firm* — Novick, Kim & Lee, PLLC; Jae Youn Kim

(57) ABSTRACT

Provided is a method for measuring the temperature at each location of a pipe in a hot water supply system comprising a water heater, a pipe, and outlets, the method comprising checking for a temperature of a first point ($T_{P1}$), which is upstream of the outlet, a temperature of a second point ($T_{P2}$), which is downstream of the outlet and an outdoor temperature ($T_A$), and confirming a length (L) of the pipe from the first point to the second point, then measuring a temperature of the pipe located at a distance of x away from the first point.

5 Claims, 2 Drawing Sheets

(51) Int. Cl.
*F24D 17/00* (2006.01)
*F24D 19/10* (2006.01)
*G01F 1/00* (2006.01)

(52) U.S. Cl.
CPC ............... *G01F 1/00* (2013.01); *G01K 7/427* (2013.01); *G01K 2013/026* (2013.01)

(56) References Cited

FOREIGN PATENT DOCUMENTS

| | | |
|---|---|---|
| KR | 10-1083649 B1 | 11/2011 |
| KR | 10-1089731 B1 | 12/2011 |
| KR | 10-2014-0023593 A | 2/2014 |

* cited by examiner

METHOD FOR MEASURING TEMPERATURE AT EACH LOCATION OF PIPE IN HOT WATER SUPPLY SYSTEM

TECHNICAL FIELD

The present invention relates to a method for measuring the temperature at a specific location of a pipe included in a hot water supply system.

BACKGROUND OF THE INVENTION

Water heaters such as gas water heaters generally have a hot water preheating function for rapidly supplying hot water which matches a set temperature for hot water. There are two types of pipe structures (or flow path types) for preheating hot water. One of them is an internal circulation preheating structure, and the other is an external circulation preheating structure (recirculation structure).

Here, as shown in FIG. 1, the pipe structure of the external circulation preheating system consists of a closed circuit where a pipe (12) is connected to a water heater (11) to form a circulation path of the hot water. In addition, it is common to install multiple water faucets (13) throughout the whole closed circuit of the pipe to draw hot water through the water faucets.

In the pipe structure of the external circulation preheating system, temperature of the hot water flowing inside the pipe varies within the length of the pipe connected. This is because there are differences such as in the heat loss due to heat radiation depending on the length of the pipe, and heat transfer rate to the outside air depending on the pipe material.

For the above reasons, in the conventional external circulation preheating method, the average temperature of the hot water inside the outer pipe is measured, and in order to supply hot water of uniform temperature to the user, a temperature sensor (14) is installed at the end location of the whole closed circuit (location of the pipe farthest from the hot water outlet location of the water heater), so that the hot water preheating temperature is controlled by using the temperature sensed by the temperature sensor.

However, such a method has many disadvantages such as requiring an additional temperature sensor to be provided in the external pipe. Particularly, as the length of the external pipe becomes longer, the connection line between the water heater and the temperature sensor becomes longer, which is inconvenient for installation. In addition, in terms of system maintenance, frequent repairs are needed.

Further, there is a problem in that as the location in the external circulation pipe for which the temperature needs to be measured increases, equal number of temperature sensors need to be installed at each location, and when malfunction such as disconnection/short-circuit occurs in the temperature sensor installed in this way, there are no means to measure the temperature inside the pipe, thereby there is a problem in that it becomes impossible to control preheating of hot water.

DISCLOSURE OF INVENTION

Technical Problem

Accordingly, the present invention has been made to solve the above-described problems occurring in the prior art, and it is an object of the present invention to provide a method capable of measuring temperature at each location of the pipe, even if a temperature sensor is not provided at the location on the pipe where temperature is desired to be checked or at the end of the circulation pipe in the hot water supply system.

Technical Solution

The measurement method according to an embodiment of the present invention is a method for measuring temperature at each location of a pipe in a hot water supply system comprising, a water heater equipped with a combustion device, a pipe connected to the water heater for circulating hot water, and an outlet installed on the pipe to allow water to be discharged, and comprises the steps of, (a) checking for a temperature ($T_{P1}$) at a first point upstream of the outlet and on the pipe, a temperature ($T_{P2}$) at a second point downstream of the outlet and on the pipe and an outdoor temperature ($T_A$), and confirming a length (L) of the pipe from the first point to the second point; (b) determining a distance x away from the first point on the pipe in order to determine a location on the pipe for which a temperature is desired to be checked; and (c) calculating a temperature ($T_X$) at a location of the pipe that is distance x away from the first point by substituting values checked and confirmed in step (a) and a value determined in step (b) into the following Equation 1.

$$T_X = T_A - (T_A - T_{P1}) \cdot e^{C \cdot x} \qquad \langle \text{Equation 1} \rangle$$

$$\text{when, } C = \frac{\ln \frac{T_A - T_{P2}}{T_A - T_{P1}}}{L}$$

$T_A$: Outdoor Temperature
$T_{P1}$: Temperature at the first point of the pipe
$T_{P2}$: Temperature at the second point of the pipe
L: Length of the pipe from the first point to the second point
x: Distance away from the first point on the pipe In the method for measuring the temperature at each location of the pipe according to the embodiment of the present invention, where the outlet consists of a plurality of outlets arranged spaced apart, the first point may be a point located upstream of the first outlet in the circulation direction of the hot water in the pipe, and the second point may be a point located downstream of the last outlet in the circulation direction of the hot water in the pipe.

In the method for measuring the temperature at each location of the pipe according to the embodiment of the present invention, a value input by the user can be substituted for the L value of Equation 1.

The method for measuring the temperature at each location of the pipe according to the embodiment of the present invention can further comprise a step of checking the flow rate of the hot water circulating through the pipe, and a value obtained by multiplying the flow rate of the hot water circulating through the pipe with time, which is the time from when temperature increase of the first point is sensed to when the temperature increase of the second point is sensed, after combustion of the combustion device, can be substituted for the L value of Equation 1.

In the method for measuring the temperature at each location of the pipe according to the embodiment of the present invention, the step of checking the outdoor temperature ($T_A$) in step (a) may be a step of checking temperature of the air supplied to the combustion device from outside and then discharged from the combustion device in a state where combustion of the combustion device is not carried out.

Advantageous Effects

According to the present invention, unlike the conventional method of measuring the temperature of the pipe in the hot water supply system, the temperature at a specific location on the pipe can be measured without installing a temperature sensor at each location on the pipe for which temperature is desired to be checked.

In addition, if the pipe is buried in the structure or a temperature sensor is already installed at a specific location on the pipe, according to the conventional method there are problems such as having to perform a separate work on the structure in order to expose the pipe so that a temperature sensor can be installed on the pipe, or involving additional pipe work so as to change the location of the previously installed temperature sensor to a different location. However, according to the present invention, the temperature at each location of the pipe can be easily measured without involving such work.

Further, the conventional method of measuring the temperature of a pipe involves measuring an average temperature inside the pipe using arithmetic mean value for a hot water outlet temperature (temperature of the pipe near a point extending from the water heater to outside of the water heater in the circulation direction of the hot water) and a recirculation inlet temperature (temperature of the pipe near the point extending into the water heater in the circulation direction of the hot water). Therefore, longer the pipe, the more difficult it is to control the temperature of the hot water discharged by each water faucet close to the set temperature. However, according to the present invention, it is possible to accurately measure the temperature at each location of the pipe, therefore there is an advantage that the hot water temperature can be accurately and easily controlled in the hot water supply system.

Furthermore, if hot water is supplied only to some parts of the whole length of the pipe, in other words if hot water is supplied to only some outlets of a plurality of outlets arranged apart from each other in the direction of the hot water circulation and the remaining outlets are not used, according to the present invention, since the temperature at the last outlet point can be relatively accurately and easily measured and used for controlling hot water, unnecessary combustion can be reduced and thereby the water heater can be economically operated.

DESCRIPTION OF THE PREFERRED EMBODIMENTS

Figure 1:
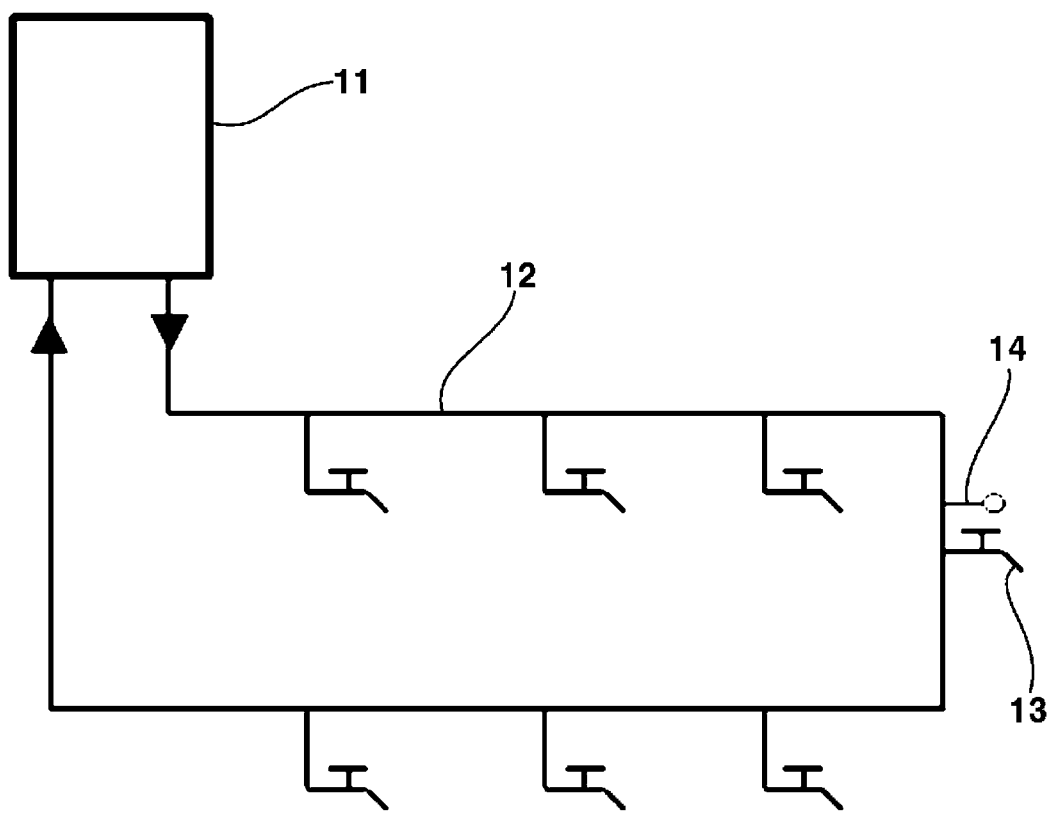
FIG. 1 is a schematic view of a conventional hot water supply system.
Figure 2:
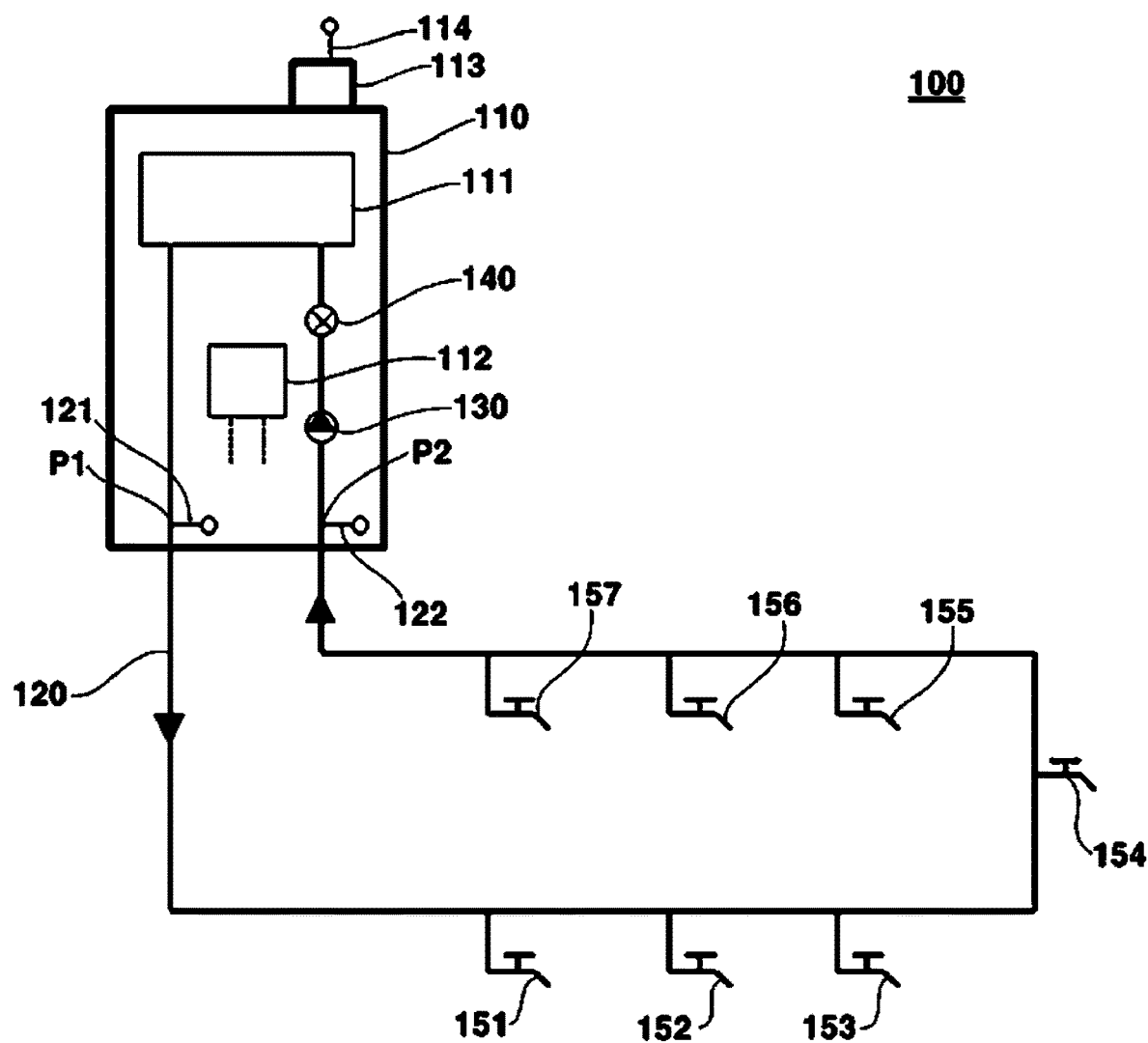
FIG. 2 is a schematic view of a hot water supply system to which a method according to an embodiment of the present invention can be applied.

Hereinafter, a method for measuring the temperature at each location of the pipe according to an embodiment of the present invention will be described in detail with reference to the accompanying drawings. FIG. 2 schematically shows a hot water supply system to which a method for measuring the temperature at each location of the pipe according to an embodiment of the present invention can be applied.

As shown, the hot water supply system (100) may comprise a water heater (110), a pipe (120), and outlets (151~157). The water heater (110) can be a gas water heater, for example, and have a combustion device (111) and a controller (112) for controlling the combustion device (111).

The pipe (120) can be connected to the combustion device (111) in the water heater (110) and extend to the inside and outside of the water heater (110). Further, inside the pipe (120), hot water can be circulated along the direction of the arrow shown. A circulation pump (130) may be installed on the pipe (120) for circulation of the hot water.

The pipe (120) can be equipped with an outlet at a portion extending from the water heater (110) and exposed to the outside. The outlet can be, for example, a water faucet or a shower. The outlet can be one or consist of a plurality of outlets (151~157) spaced apart along the length of the pipe (120) as shown.

Moreover, a flow sensor (140) capable of measuring the flow rate of the hot water can be installed on the pipe (120).

In the hot water supply system (100) as above, the method for measuring the temperature at each location of the pipe according to the embodiment of the present invention comprises the steps of (a) checking for a temperature ($T_{P1}$) at a first point (P1) upstream of the outlet and on the pipe (120), a temperature ($T_{P2}$) at a second point (P2) downstream of the outlet and on the pipe (120) and an outdoor temperature ($T_A$), and confirming a length (L) of the pipe (120) from the first point (P1) to the second point (P2); (b) determining a distance x away from the first point (P1) on the pipe (120) to determine a location on the pipe (120) for which a temperature is desired to be checked; and (c) calculating a temperature ($T_X$) at a location of the pipe (120) that is distance x away from the first point (P1) by substituting values checked and confirmed in step (a) and a value determined in step (b) into the following Equation 1.

$$T_X = T_A - (T_A - T_{P1}) \cdot e^{C \cdot x} \qquad \langle \text{Equation 1} \rangle$$

$$\text{when, } C = \frac{\ln\frac{T_A - T_{P2}}{T_A - T_{P1}}}{L}$$

In Equation 1, $T_A$ represents outdoor temperature, $T_{P1}$ represents temperature at the first point (P1) of the pipe (120), $T_{P2}$ represents temperature at the second point (P2) of the pipe (120), L represents the length of the pipe (120) from the first point (P1) to the second point (P2), and x represents the distance away from the first point (P1) on the pipe (120).

The above mentioned first point (P1) is a point on the pipe (120) upstream of the outlet, and if the outlet consists of a plurality of outlets, it may be a point upstream of an outlet (151) located first on the pipe (120) in the circulation direction of the hot water.

More specifically, the first point (P1) may be a point near the point where the hot water starts being discharged from the water heater (110) in the circulation direction of the hot water in the pipe (120), and in FIG. 2 the first point (P1) is shown as the location on the pipe (120) immediately before the hot water is discharged from the water heater (110).

A first temperature sensor (121) may be installed at the first point (P1) on the pipe (120), such that a temperature ($T_{P1}$) of the first point (P1) can be checked by the first temperature sensor (121).

The above mentioned second point (P2) is a point on the pipe (120) downstream of the outlet, and if the outlet consists of a plurality of outlets, it may be a point downstream of an outlet (157) located last on the pipe (120) in the circulation direction of the hot water.

More specifically, the second point (P2) may be a point near the point where the hot water starts being discharged from the water heater (110) in the circulation direction of the hot water in the pipe (120), and in FIG. 2 the second point (P2) is shown as the location on the pipe (120) immediately after the hot water is returned to the water heater (110).

A second temperature sensor (122) may be installed at the second point (P2) on the pipe (120), such that a temperature ($T_{P2}$) of the second point (P2) can be sensed by the second temperature sensor (122).

The outdoor temperature ($T_A$) can be checked in various ways. Prior to citing an example of a specific checking method, first, the air for combustion can be supplied from the outside, for example, by a blower fan to the combustion device (111), and the exhaust gas after combustion can be discharged to the outside along a discharge route (113) connected to the combustion device (111).

As shown, a third temperature sensor (114) can be installed on the discharge route (113) of the exhaust gas, and the temperature of the exhaust gas can be sensed by the third temperature sensor (114) and used for control when necessary.

The outdoor temperature can be checked by the third temperature sensor (114). Specifically, by operating the blower fan in a state where the combustion is not carried out in the combustion device (111), the air supplied from outside to the combustion device (111) can be discharged to the outside along the discharge route (113) without being used for combustion. The third temperature sensor (114) can sense the temperature of the air discharged in this way, and regard the sensed temperature as the outdoor temperature. That is, temperature sensed in this way can be used to check the outdoor temperature.

It goes without saying that the outdoor temperature can be checked using various known methods in addition to the above-mentioned method.

If the user already knows the length of the pipe (120) from the first point (P1) to the second point (P2), the length can be confirmed by the user inputting the length value through the input means (not shown).

The length can also be confirmed using the value obtained by multiplying the flow rate of the hot water circulating the pipe (120) with time, which is the time from when the temperature increase of the first point (P1) is sensed to when the temperature increase of the second point (P2) is sensed, after combustion of the combustion device (111). At this time, the flow rate of the hot water can be sensed by the flow sensor (140) described above.

The specific location of the pipe (120) for which temperature is desired to be checked can be defined as a location on the pipe (120) at a distance of x away from the first point (P1).

The distance x can be determined by a user or by a program designed for hot water control or the like. If the length is determined by the user, it can be determined by the user inputting the value of x to the input means (not shown).

The temperature ($T_X$) at a location of the pipe (120) at a distance of x away from the first point (P1) can be calculated by substituting the values checked and confirmed and the value determined as above into Equation 1. The temperature ($T_X$) calculated in this way can be used as a value necessary for efficient control of the hot water in the hot water supply system (100).

The aforementioned steps (a), (b), and (c) can be performed by the controller (112) of the water heater (110), but are not limited thereto.

Table 1 below shows data on the temperature ($T_X$) at each outlet (151~157) location measured using Equation 1, when the temperature ($T_{P1}$) of the first point (P1) is 45.0° C. and the temperature ($T_{P2}$) of the second point (P2) is 35.0° C., under certain conditions, specifically in which the outdoor temperature ($T_A$) is 25.0° C., the pipe length (L) from the first point (P1) to the second point (P2) is 40 m, and the outlets (151~157) are arranged spaced apart at 5 meter intervals from the first point (P1).

TABLE 1

| $T_A$ ° C. | $T_{P1}$ ° C. | $T_{P2}$ ° C. | L m | X m | C | $T_X$ ° C. |
|---|---|---|---|---|---|---|
| 25.0 | 45.0 | 35.0 | 40 | 5 | −0.01733 | 43.3 |
| 25.0 | 45.0 | 35.0 | 40 | 10 | −0.01733 | 41.8 |
| 25.0 | 45.0 | 35.0 | 40 | 15 | −0.01733 | 40.4 |
| 25.0 | 45.0 | 35.0 | 40 | 20 | −0.01733 | 39.1 |
| 25.0 | 45.0 | 35.0 | 40 | 25 | −0.01733 | 38.0 |
| 25.0 | 45.0 | 35.0 | 40 | 30 | −0.01733 | 36.9 |
| 25.0 | 45.0 | 35.0 | 40 | 35 | −0.01733 | 35.9 |
| 25.0 | 45.0 | 35.0 | 40 | 40 | −0.01733 | 35.0 |

The embodiments of the present invention have been described above. However, the above-described embodiments only illustrate the preferred embodiments of the present invention, and the present invention is not limited thereto. It will be understood by those skilled in the art that various modifications and equivalents can be made from the above-described embodiments.

REFERENCE SIGNS

100: Hot Water Supply System
110: Water Heater
111: Combustion Device
112: Controller
113: Discharge Route
114: Third Temperature Sensor
120: Pipe
121: First Temperature Sensor
122: Second Temperature Sensor
130: Circulation Pump
140: Flow Sensor
151~157: Outlet 1~Outlet 7
P1: First point
P2: Second point

The invention claimed is:

1. A method for measuring temperature at a location of a pipe in a hot water supply system comprising a water heater equipped with a combustion device, the pipe connected to the water heater for circulating hot water, and an outlet installed on the pipe to allow water to be discharged, the method comprising the steps of:

(a) checking for a temperature ($T_{P1}$) at a first point upstream of the outlet and on the pipe, a temperature ($T_{P2}$) at a second point downstream of the outlet and on the pipe and an outdoor temperature ($T_A$), and confirming a length (L) of the pipe from the first point to the second point;

(b) determining a distance (x) away from the first point on the pipe to determine the location on the pipe for which a temperature is desired to be checked; and (c) calculating a temperature ($T_x$) at the location of the pipe that has the distance (x) away from the first point by substituting values checked and confirmed in step (a) and a value determined in step (b) into the following Equation 1:

$$T_X = T_A - (T_A - T_{P1}) \cdot e^{C \cdot x}$$

$$\text{when, } C = \frac{\ln\frac{T_A - T_{P2}}{T_A - T_{P1}}}{L},$$

wherein $T_A$ is the outdoor temperature;
$T_{P1}$ is the temperature at the first point of the pipe;
$T_{P2}$ is the temperature at the second point of the pipe;
L is a length of the pipe from the first point to the second point; and
x is the distance away from the first point on the pipe.

2. The method as claimed in claim 1, wherein if the outlet comprises a plurality of outlets installed spaced apart, the first point is a point located upstream of a first outlet in a circulation direction of the hot water in the pipe, and the second point is a point located downstream of a last outlet in the circulation direction of the hot water in the pipe.

3. The method as claimed in claim 1, wherein a value input by a user is substituted for L value of Equation 1.

4. The method as claimed in claim 1, further comprising a step of checking a flow rate of the hot water circulating through the pipe, wherein a value obtained by multiplying the flow rate of the hot water circulating through the pipe with time, which is the time from when a temperature increase of the first point is sensed to when the temperature increase of the second point is sensed, after combustion of the combustion device, is substituted for L value of Equation 1.

5. The method as claimed in claim 1, wherein the step of checking the outdoor temperature ($T_A$) in step (a) is a step of checking a temperature of air supplied to the combustion device from outside of the combustion device and then discharged from the combustion device in a state where combustion of the combustion device is not carried out.

* * * * *